United States Patent [19]
Hwang et al.

[11] 3,740,641
[45] June 19, 1973

[54] PROCESS FOR DETERMINING HYDROCARBON MATURITY USING ELECTRON SPIN RESONANCE

[75] Inventors: Philip T. R. Hwang; Walter C. Pusey, III, both of Ponca City, Okla.

[73] Assignee: Continental Oil Company, Ponca City, Okla.

[22] Filed: Aug. 25, 1971

[21] Appl. No.: 174,758

[52] U.S. Cl............324/0.5 R, 23/230 EX, 175/50, 166/250
[51] Int. Cl. ............................................ G01n 27/78
[58] Field of Search..................... 324/0.5 G, 0.5 R; 23/230 E X; 166/250; 175/45, 50

[56] References Cited
OTHER PUBLICATIONS

Marchand et al., Geochemie et Diagenese, C. R. Acad. Sc. Paris, t. 266, Series D, 6/17/68, pp. 2316–2319.

Primary Examiner—Michael J. Lynch
Attorney—Joseph C. Kotarski, Henry H. Huth and William J. Miller et al.

[57] ABSTRACT

A process for predicting the presence and maturity of hydrocarbon material in a subterranean situs by initially treating a number of rock samples derived from an exploratory well or surface outcrops to remove certain materials therefrom, including carbonates and layered silicates. The samples, as thus prepared, are then subjected to observation of the paramagnetic resonance (electron spin resonance) properties of the kerogen entrapped in the samples, and from these properties, the maximum thermal histories of the samples are evaluated, and a maximal geothermal gradient for the formation is derived. The maximal geothermal gradient is extrapolated to a depth of interest to predict the type of hydrocarbon production, if any, which may be reasonably contemplated from that depth in the formation.

13 Claims, 6 Drawing Figures

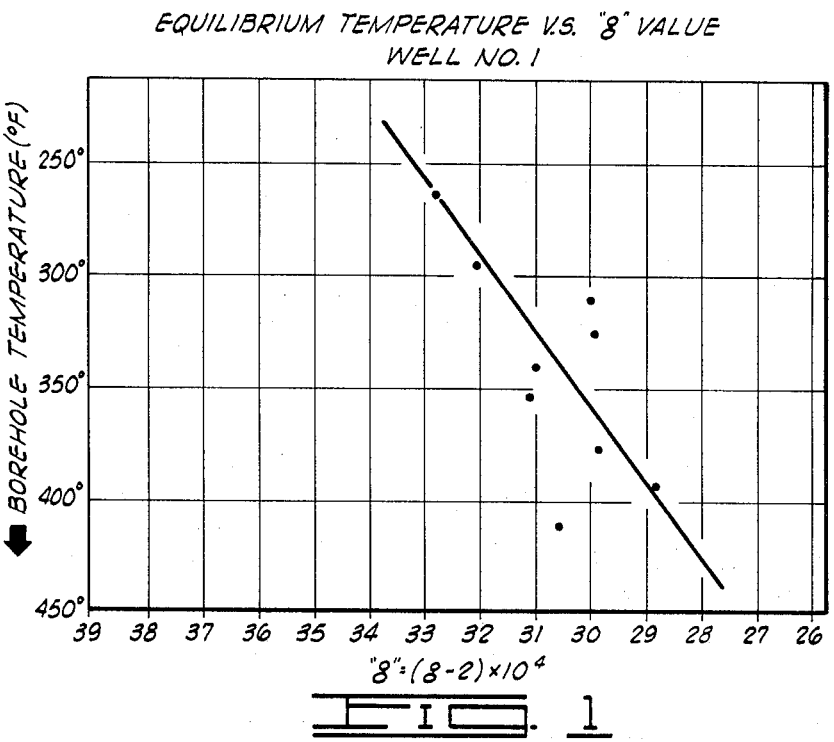
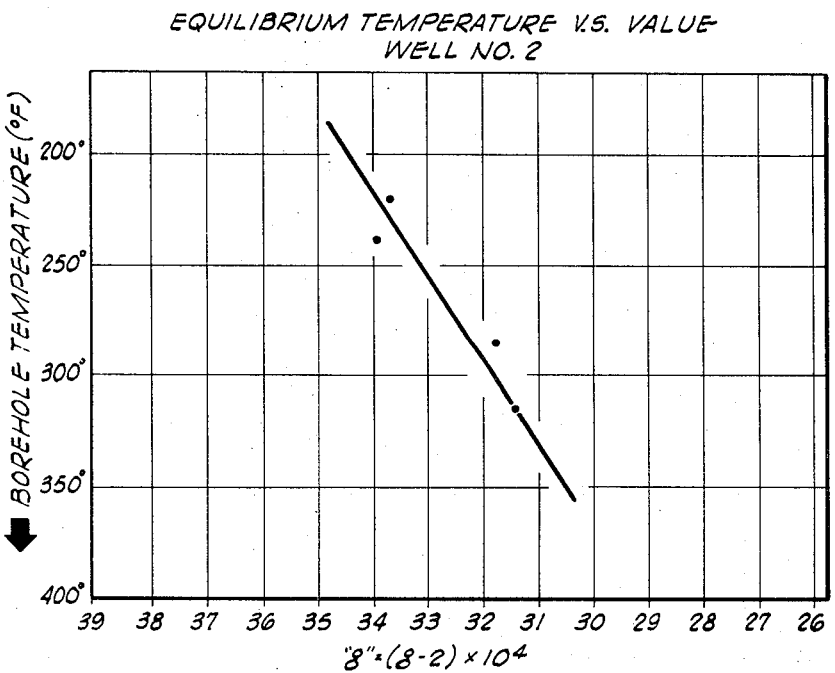

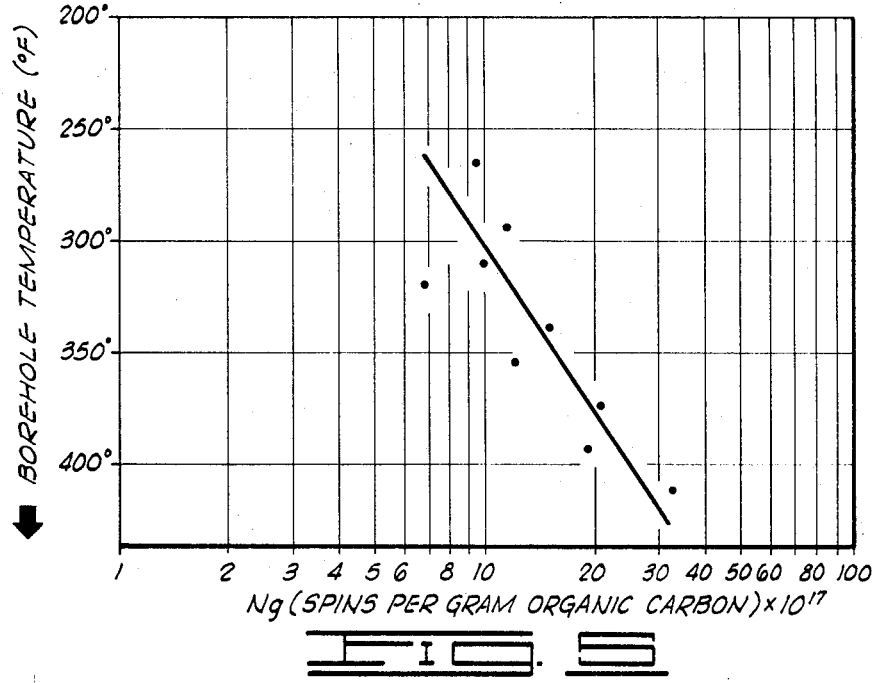
FIG. 5
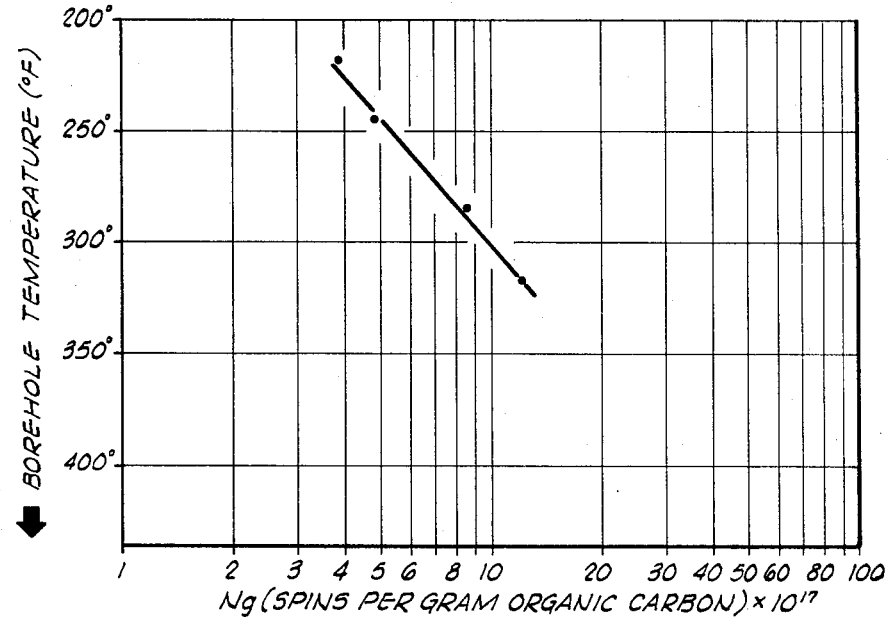
FIG. 6
INVENTORS
PHILIP T. R. HWANG &
WALTER C. PUSEY III
BY 
ATTORNEY

PROCESS FOR DETERMINING HYDROCARBON MATURITY USING ELECTRON SPIN RESONANCE

BACKGROUND OF THE INVENTION

1. Field of the Invention

This invention relates to the employment of the geothermal history of the kerogen content of samples from subterranean formations for the purpose of predicting the success with which useful hydrocarbons, such as petroleum and natural gas, can be produced from the formations from which the samples are taken. More particularly, the invention relates to the use of paramagnetic resonance determinations on rock samples from a formation of interest to determine the thermal history of the formation and from this, the probable type of hydrocarbon content of the formation.

2. Brief Description of the Prior Art

Geologists have, for some time, been aware of the existence of a correlation between the thermal history of organic materials found in subterranean environments, with the types, and to a lesser extent, the quantity, of deposits of such materials which can be expected to occur at various depths in the same formation. Thus, if a given lithology has, during its geologic history, attained a maximum temperature of a certain magnitude, it may be anticipated that, if other geological conditions are favorable, petroleum would have been formed from organic materials during the time of such attainment of maximum temperature, and the presence of petroleum deposits in such lithology may be reasonably predicted. Where this optimum temperature level conducive to petroleum formation was either exceeded during the thermal history of the lithology of interest, or has not been attained during such history, then petroleum production is not to be anticipated. Rather, immature hydrocarbons may exist at the situs in question, or no hydrocarbons may have been formed, or natural gas may be the hydrocarbon which thermal conditions existing over the history of the formation have effectively produced. It is further known that in a few locations in the world, the subterranean formations are currently at their maximum geothermal temperature.

Various techniques for ascertaining the thermal history of subterranean formations have been heretofore utilized. Electric well logs, of course, provide some indication of the current thermal characteristics of formations traversed by well bores, but often temperature data derived from this source is not susceptible to conversion to accurate information concerning the thermal history of the formation. Techniques have also recently been developed which are based upon an observed correlation between one or more properties of the kerogenous material entrapped in subterranean rocks, and the thermal history of these rocks. One of these techniques entails the use of optical observations of the kerogen content of the rocks. This method, however, has been limited by its inability to evaluate very finely dispersed kerogen fragments.

A reflectance technique has been used with coal bearing strata to derive thermal history data concerning the coal bearing potential of the formation, but is generally only useful where the formation temperatures involved are above about 300°F.

Several other methods have been employed to evaluate the thermal history of subterranean environments, but each method is limited as to the conditions under which it may be usefully employed.

BRIEF DESCRIPTION OF THE PRESENT INVENTION

The present invention is based, in part, upon the prior knowledge that the thermal history of a subterranean situs can be used to estimate or predict the type of hydrocarbon content that is apt to presently characterize the situs, and upon our determination that the paramagnetic resonance properties of kerogenous materials presently located in rock samples are directly related to the thermal and radioactive history of that kerogenous material. We have further determined that in most instances, the radio-activity effect is not significant, and the thermal history effect on paramagnetic resonance properties is dominant.

Broadly described, our invention comprises initially establishing that a reproducible and substantially universal correlation exists between the thermal history and the paramagnetic resonance properties of entrapped kerogenous material in rock samples taken from known depths in formations having a known thermal history, and then from the established correlation, preparing standard calibration curves of maximal thermal history vs. paramagnetic resonance properties. These standard curves then are used with appropriate electron spin resonance analyses of selected rock samples to measure the maximum thermal history of lithological structures of unknown thermal histories, and from these measurements, the maximal geothermal gradient of the vertical profile of the drilling well can be derived. With this information in hand, valuable predictions of the type of hydrocarbon production which may be anticipated are possible.

It should be further pointed out that another important aspect of the present invention is the determination of a sampling technique which permits the described correlation between paramagnetic resonance properties and thermal history to be established and consistently maintained. In general, this technique entails the elimination or exclusion from rock samples of substances which interfere with the accurate measurement of the desired ESR parameters of the kerogenous material. More specifically, the sample preparation technique used for preparing rock samples for measurement of paramagnetic resonance properties, and constituting an important aspect of the present invention, comprises treating the sample with a strong mineral acid to remove carbonate compounds therefrom, and also treating the sample with hydrofluoric acid to remove silicate compounds therefrom.

An important object which is achieved by the invention is the provision of a new method for determining the thermal history of subterranean formations, which method is more universal in applicability than methods previously used for this purpose, and can be used to evaluate the thermal history of diverse lithologies, including marine shales, lignite and coal deposits, non-marine shales and carbonate rocks. The method may also be applied to a wide variety of sample types, including conventional cuttings and sidewall cores.

Another object of the invention is to provide an improved sampling procedure for concentrating the kerogen content of raw rock samples from subterranean formations, and for removing certain materials which interfere with the accurate evaluation of the properties of the kerogen.

Other objects and advantages of the invention will become apparent as the following detailed description of the invention is read in conjunction with the accompanying drawings which illustrate certain aspects of the practice of the invention.

BRIEF DESCRIPTION OF THE DRAWINGS

FIG. 1 is a graph in which the known borehole temperatures of a first existing well are plotted against the sampled kerogen spectral line position in the magnetic field applied during ESR measurements of a series of rock samples taken during drilling.

FIG. 2 is a graph similar to FIG. 1 for another well.

FIG. 5 is a graph in which the known borehole temperature of the well referred to by the graph of FIG. 1 is plotted against the electron spin concentration or density (in spins per gram of organic carbon) of the series of samples taken during drilling.

FIG. 6 is a graph similar to FIG. 5 for the second well referred to in the graphs of FIGS. 2 and 4.

DETAILED DESCRIPTION OF A PREFERRED EMBODIMENT

Figure 3:
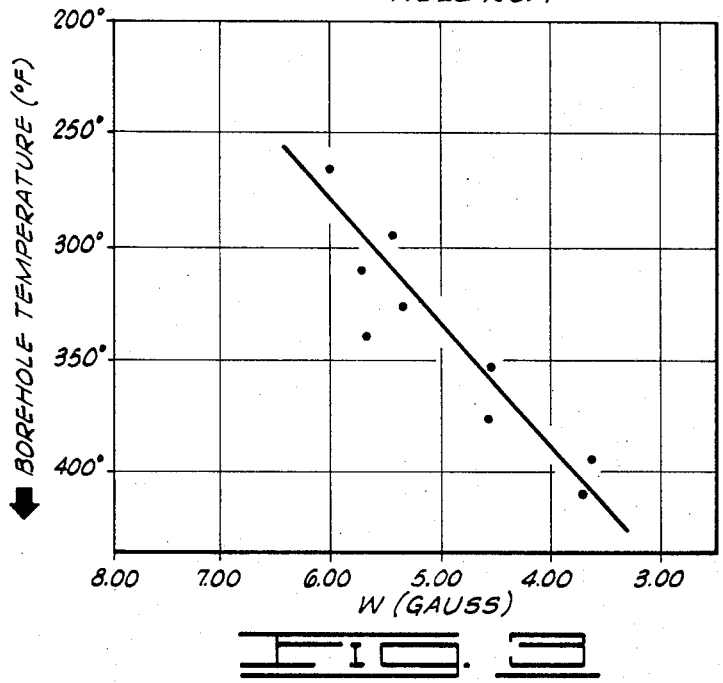
FIG. 3 is a graph in which the known borehole temperature of the well referred to by the graph of FIG. 1 is plotted against the sampled kerogen spectral line width during ESR measurements of the same series of rock samples examined in developing the FIG. 1 graph.

The initial step in the practice of the process of the present invention is that of establishing a correlation between the paramagnetic resonance properties of kerogen entrapped in subterranean rocks with the maximum thermal history of that kerogen. This correlation establishment is accomplished by first taking a series of rock samples from varying depths in a well drilled into a formation which is known to be at its maximum thermal history and then, after appropriate treatment of these samples, measuring the paramagnetic resonance properties of the kerogen in the samples and determining the existence of a correlation, if any, between such samples and the known thermal properties of the samples as previously determined by other means. Once the correlation is found to exist, other tests from formations in other locations are conducted to determine whether the correlation will hold true for subterranean formations in general. When the universality of the correlation between magnetic resonance properties and thermal history is thus confirmed, the thermal history of an unknown, previously unexplored area may be evaluated by appropriate sampling through one or more exploratory wells, and subjecting the samples derived from these wells at various depths to measurement of the appropriate paramagnetic resonance parameters. Actually, this substantially universal correlation has now been established, so that the present invention in its broadest aspect comprises taking a series of rock samples from varying depths in a "thermally unknown" formation, measuring the ESR parameters of the samples, and evaluating the thermal history of the formation from these parameters.

An important aspect of the invention is the manner in which rock samples are to be prepared so as to give reproducible and meaningful electron spin resonance values. We have determined that certain materials nearly always present in subterranean rock samples must be removed from the rock samples before conducting electron spin resonance measurements on the sample because of their propensity to interfere with accurate measurement of these parameters. Two materials which have been determined to be especially deleterious in the samples as finally prepared are carbonate compounds and layered silicate compounds. To the end of treating the raw rock samples to concentrate the kerogen and to eliminate these interfering materials, a sample treatment method has been devised which very effectively removes these materials from the kerogen-containing rock.

In the procedure of treatment, a rock sample is utilized which is of sufficient size that, upon completion of the sample preparation treatment, the remaining sample subjected to ESR measurements will preferably contain at least 1 weight percent kerogen. In general, the amount of raw rock sample utilized at the start of the treatment will be from about 4 grams to about 8 grams, depending upon the type of rock being subjected to the treatment, with, for example, about 5 grams of marine shale being typical of an original sample quantity. The rock sample is pulverized so that it will consist of particles having a mesh size of 60, or smaller.

The pulverized sample is subjected to contact with a mineral acid solution for the purpose of dissolving carbonate compounds contained in the sample. In general, from about 10 ml. to about 100 ml. of a 10 normal mineral acid solution may be used in this step of the sample treatment, with from about 40 ml. to about 70 ml. of 10 normal hydrochloric acid solution being a typical treatment in the case of marine shale samples. The acidized shale sample is agitated to assure thorough mixing, and the reaction by which the carbonate compounds are rendered acid soluble is allowed to proceed to completion, this reaction generally being terminated within a period of about 30 minutes.

After the mineral acid treatment, the acidic liquid phase is decanted from the pulverized sample particles, the sample is washed thoroughly with distilled water, and the wash water removed by decantation.

After washing the sample, from about 10 ml. to about 50 ml. of 52 weight percent hydrofluoric acid solution is added to the pulverized sample for the purpose of removing layered silicate compounds therefrom. Usage of a higher concentration of hydrofluoric acid may produce violent reactions which may cause excess heating and alteration of the kerogen. The hydrofluoric acid-sample mixture is stirred to assure thorough mixing and then allowed to stand for about one hour, followed by a repetition of the stirring. The reaction of the acid with the sample is then permitted to continue to completion. This will usually occur within a period of about 4 hours.

After completion of the hydrofluoric acid reaction with the sample, the mixture of sample and acid is transferred to a suitable separatory device, preferably a centrifuge, and the solid sample particles are removed from the acidic liquid phase. The solid particles of sample are then washed with distilled water, and the wash water removed by centrifugation or filtration.

There is next preferably added to the sample, from about 3 ml. to about 7 ml. of a volatile, inert organic solvent, such as acetone for the purpose of dispersing the sample. From about 40 ml. to about 80 ml. of 70 weight percent hydrofluoric acid is then added to the mixture of acetone and sample, and the mixture is then stirred from time to time for a period of about 2 hours. If, during this time, there ceases to be further visible reaction (gas evolution) between the hydrofluoric acid and the sample, this indicates that no further hydrofluoric acid treatment is needed, and separation of the acid from the sample can be effected. If a vigorous reaction is observed to occur and is not completely terminated by the end of this period, however, the sample must be further treated with an additional 30 ml. to 60 ml. of 70 weight percent hydrofluoric acid solution, and stirring continued until no further visible reaction between the acid and sample is perceived to occur.

After the second hydrofluoric acid treatment of the type described (that is, with the 70 weight percent hydrofluoric acid), the acid solution is separated from the sample by centrifugation or other suitable means. The sample is then washed several times with distilled water, followed by several washings with acetone, or other volatile, inert organic solvent. In each instance, the water and acetone are separated from the sample by any suitable means such as decantation, filtration or centrifugation.

If, following the washing of the sample with water and acetone, the last acetone wash is brown in color, the sample should be washed again until the washing solution is light yellow in color.

Upon completion of the washing with water and acetone, the sample is transferred to an evaporating dish, along with about 20 ml. of inert, relatively volatile organic solvent, such as acetone, and the acetone is permitted to evaporate to sample dryness. The dry sample is then re-ground to approximately 60 mesh size or smaller, and is stored pending ESR analysis.

The described sampling technique yields from the original raw rock sample, a final sample having a kerogen content exceeding 1 weight percent, and free of interfering and diluting minerals, such as carbonates and layered silicates.

To establish the existence of a useful correlation between paramagnetic resonance parameters of samples as thus prepared and the thermal properties of the formation from which such samples are derived, it is initially necessary to identify any existent correlation between ESR parameters and the known thermal properties of samples taken from wells extended into formations having known and confirmed thermal properties. The known thermal properties of certain formations have been established by any one or more of a number of techniques, including electric log runs confirmed by other tests. For many known hydrocarbon producing fields, the Federal Power Commission of the United States Government has published thermal gradient data for the subterranean formations of such fields. These lithologies of known thermal characteristics can thus be used as sources from which samples may be obtained for the purpose of correlating ESR parameters with geothermal history, and for developing a set of calibration curves to be used in testing unknown formations concerning which little is known relative to the geothermal history thereof.

In carrying out the process of the present invention, we have established that a repeatable, and substantially universal correlation exists between three parameters or properties yielded by paramagnetic resonance analysis of treated rock samples, and the thermal histories of these samples. The parameters useful in this respect are (a) the $g$ value of the sample, which value is determined by the spectral line position of the sample in the magnetic field established during electronic spin resonance analysis, (b) the "W" value of the sample, which value is established by the spectral line width of the sample as measured in Gauss units, and (c) the $Ng$ value of the sample, which value is the spin concentration of the sample in spins per gram of organic carbon. Each one of these values for a given rock sample will be indicative (through the described correlation) of the highest temperature "seen" by the kerogen and rock sample during their geologic history. By obtaining a plurality of rock samples at varying depths in a formation, as may be done by the drilling of an exploratory well, or from surface outcrops, a maximum geothermal gradient of the profile of the drilling well can be established by plotting the described parameters against depth, and assigning to each of the parameters for each depth, its correlative maximal temperature value. Extrapolation of the calibration curves thus developed then indicates to the geologist, the relative maturity of the hydrocarbon deposits which can be expected to occur at projected depths not yet reached by the well.

As further illustrative of the practice of the invention, the following description exemplifies the manner in which the correlation between the electron spin resonance parameters and thermal history was obtained, and the manner in which the calibration curves were established therefrom. A number of rock samples were obtained from different depths in two different producing wells in Louisiana. The wells were drilled in relatively geologically young formations in a simple tectonic setting in which increasing burial is predominant. The equilibrium temperatures prevailing in the wells were known to be geologically maximal, and the formations had been at these temperature values for nearly a million years. The present equilibrium temperatures of the two wells were derived from electric log data and from data provided by the Federal Power Commission of the United States.

In the case of each of the rock samples taken from the two wells at varying depths, about 5 grams of each rock sample was ground to a particle size not exceeding 60 mesh. The pulverized 5 gram sample was then, in each case, placed in a 100 ml. polyethylene beaker, and 50 ml. of 10N HCl solution were added to the beaker. The acidized sample was stirred, and evidence of reaction was observed to have terminated within 30 minutes. The liquid phase was then decanted from the sample particles, and the sample washed once with 80 ml. of distilled water.

50 ml. of 52 weight percent hydrofluoric acid solution were then added to the pulverized sample and stirred gently with a polyethylene rod to insure complete mixing. After about 4 hours, the sample was transferred to a 100 ml. polyethylene test tube, and the liquid phase was separated by centrifuging at 1,500 RPM for a period of 2 minutes. The solid sample was then washed with 80 ml. distilled water, and the sample again separated from the wash water by centrifuging at 1,500 RPM for 2 minutes.

5 ml. of acetone was then added to the sample in the polyethylene test tube, and an electrical stirrer was used to vibrate the sample particles free from the bottom of the test tube. 50 ml. of 70 weight percent hydrofluoric acid were then poured into the test tube, and the mixture stirred with a polyethylene rod periodically over a period of 2 hours. The hydrofluoric acid solution was then separated from the rock samples by centrifuging in the manner previously described, and the sample then washed twice with 60 ml. of distilled water, and twice with 60 ml. of acetone. After each washing, the water and acetone were separated by centrifugation. The sample particles were then transferred to a 100 ml. evaporating dish, and approximately 20 ml. of pure acetone was mixed with the sample. The sample was then evaporated to dryness, reground to a particle size not exceeding 60 mesh, and stored in an 8 oz. vial pending ESR analysis.

In the ESR analyses of the several rock samples prepared in the manner described, a commercial ESR instrument was utilized, and standard techniques were employed. The parameters measured were peak position (g), peak width (W), and spins per gram of organic carbon (Ng).

Figure 4:
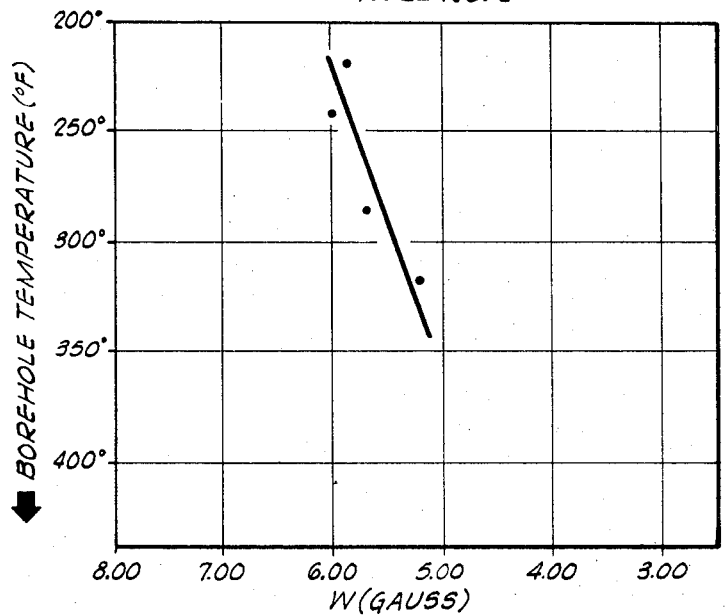
FIG. 4 is a graph similar to FIG. 3 for the well referred to in the graph of FIG. 2.

The ESR parameters, as thus measured for the kerogenous material in the treated rock samples, and the depth of the two wells from which each of the several samples were recovered are shown in Tables I and II. Then, using the published or determined present temperature gradient values for the wells involved to estimate the temperature at the various depths from which the rock samples were taken, the equilibrium temperatures, known for these wells to be at maximal historic geothermal temperature, were plotted against the various ESR parameters determined for the several samples. These graphs of bore hole temperature plotted against the ESR parameter values appear in the drawings as FIGS. 1 – 6. For convenience of interpretation, the conventional peak position value, g, has been converted to a more usable value $g$ which is defined as follows:

$$g = (g-2) \times 10^4$$

It will be noted in referring to the graphs of FIGS. 1–6 that, though there is some scatter in the data points, the cross-check between the two wells indicates a repeatability of correlation between each of the ESR parameters and a known value for the highest temperature seen by the kerogen in the samples during their geologic history. It will be realized, of course, that some small amount of error is entailed in the calculation of the plotted temperatures from electric log measurements and Federal Power Commission temperature gradient data. The curves developed can be extrapolated, or the measurements and curves interpolated, to yield the maximum geothermal value which corresponds to any observed value of any one of the three ESR parameters. We have also further confirmed and more precisely identified the correct correlative maximum temperature values through repetition of our calibration measurements in a number of other geographical locations involving diverse lithologies. In such diverse lithologies, the correlation has been found to hold true.

Using the established correlative values of maximum thermal history temperatures of subterranean kerogen samples for each of the described measurable ESR parameters of such samples, it is possible to identify by ESR analysis of a prepared sample, the maximum temperature which the rock at the location from which the sample is taken has reached during its geologic history. It will further be perceived that by taking a series of rock samples from varying depths in a given location, a maximum thermal history gradient may be established for that formation whereby, by extrapolation, the maximum temperature historically experienced by the rock at a certain depth of interest can be accurately estimated. From this estimated value of the maximum TABLE I
KEROGEN ESR PARAMETERS AND DEPTH OF WELL NO. 1
OWEN NO. 1–FONTENOT, VERMILION PARISH, LOUISIANA

KEROGEN ESR PARAMETERS

| Sample No. | Depth Interval | W (gauss) | "g" $(g-2) \times 10^4$ | Ng Spins/Gram Organic Carbon | Equilibrium Temperature at Mean Depth* |
|---|---|---|---|---|---|
| 1 | 12,990–13,116 | 6.00 | 32.8 | $9.37 \times 10^{17}$ | 265°F |
| 2 | 14,916–15,105 | 5.42 | 32.1 | $11.91 \times 10^{17}$ | 295°F |
| 3 | 14,914–16,072 | 5.75 | 30.0 | $9.80 \times 10^{17}$ | 310°F |
| 4 | 16,972–17,100 | 5.36 | 30.0 | $6.90 \times 10^{17}$ | 326°F |
| 5 | 17,820–18,270 | 5.73 | 31.1 | $15.20 \times 10^{17}$ | 341°F |
| 6 | 18,720–19,440 | 4.56 | 31.2 | $12.30 \times 10^{17}$ | 356°F |
| 7 | 20,040–20,670 | 4.57 | 29.9 | $20.87 \times 10^{17}$ | 376°F |
| 8 | 21,420–22,200 | 3.65 | 28.9 | $19.74 \times 10^{17}$ | 397°F |
| 9 | 22,680–23,148 | 3.72 | 30.6 | $32.30 \times 10^{17}$ | 414°F |

*Temperature calculated from 1.50°F/100 ft. temperature gradient determined from E-log runs.

TABLE II

KEROGEN ESR PARAMETERS AND DEPTH OF WELL NO. 2
J. P. OWEN NO. 1–BOURGE, TERREBONNE PARISH, LOUISIANA

KEROGEN ESR PARAMETERS

| Sample No. | Depth Interval | W (gauss) | "g" $(g-2) \times 10^4$ | Ng Spins/Gram Organic Carbon | Equilibrium Temperature at Mean Depth* |
|---|---|---|---|---|---|
| 1 | 11,689–11,869 | 5.87 | 33.7 | $3.86 \times 10^{17}$ | 220°F |
| 2 | 13,637–13,947 | 5.98 | 34.0 | $4.86 \times 10^{17}$ | 245°F |
| 3 | 16,878–16,972 | 5.70 | 31.8 | $8.85 \times 10^{17}$ | 286°F |
| 4 | 19,534–19,753 | 5.20 | 31.5 | $12.52 \times 10^{17}$ | 317°F |

*Based on FPC gradient for field of 1.23°F/100 ft.

temperature which has been experienced by the formation lying at that depth, an accurate judgement can be made as to whether thermal conditions which have been experienced by the formation of interest would have been favorable to the formation of petroleum or natural gas. If formation of these desirable hydrocarbons has been thermally favored, and if other geological and lithological characteristics of the formation and subterranean environment are also favorable, it may be predicted with considerable accuracy that petroleum will be present at the described location. On the other hand, even though the geophysical characteristics of the formation, and certain known geologic and seismic data suggest that the environment is presently favorable for petroleum production, if the thermal history, as determined by the method of the present invention, has not been conducive to the formation of petroleum or natural gas, then we have found in many instances that neither petroleum nor natural gas indeed occur at the projected depths of interest.

Although certain specific embodiments of the invention have been herein described in order to apprise those skilled in the art of the manner in which the invention is to be practiced, it will be understood that various changes and innovations may be made in the described procedure, particularly in the sampling procedure outlined herein, without departure from these basic principles. Changes and innovations of this type are deemed to be circumscribed by the spirit and scope of the invention, except as the same may be necessarily limited by the appended claims or reasonable equivalents thereof.

What is claimed is:

1. A process for determining the thermal history of a subterranean situs comprising:
    removing kerogen containing rock samples from the subterranean situs;
    treating the rock samples to remove substantially all of the carbonate and all of the layered silicate compounds therefrom;
    measuring, for each treated sample, at least one electron spin resonance property correlatable to the maximum thermal history of the sample; and
    graphically plotting the correlation to the maximum thermal history of the sample to derive an indication as to the probability of presence of petroleum product at said subterranean situs.

2. A process as defined in claim 1 wherein said rock sample treatment comprises:
    contacting the rock samples with a concentrated mineral acid; and then
    contacting the rock samples with hydrofluoric acid.

3. A process as defined in claim 1 wherein the electron spin resonance property measured is the spectral line position of the sample in the established magnetic field.

4. A process as defined in claim 1 wherein the electron spin resonance property measured is the spectral line width of the sample.

5. A process as defined in claim 1 wherein the electron spin resonance property measured is the spin concentration in spins per gram of organic carbon in the sample.

6. A process as defined in claim 1 wherein said rock samples are removed from a plurality of vertically spaced locations in an upper portion of said subterranean situs, and a graphical plot of the depth of said locations vs. the measured electronic spin resonance properties of said samples is extrapolated to other depths in the lower portion of said situs to indicate the maximum thermal history at said other depths.

7. A process as defined in claim 1 wherein said removed samples are of a size before treatment to contain at least 1 weight percent kerogen following treatment.

8. A process as defined in claim 2 wherein said sample treatment with the said acids further comprises:
    initially crushing the samples to a particle size not exceeding 60 mesh, contacting the crushed sample with from about 10 ml. to about 100 ml. of 10 normal hydrochloric acid for each 4 to 8 grams of sample to solubilize the carbonate compounds;
    washing the sample with water;
    contacting the sample with from about 10 ml. to about 50 ml. of 52 weight percent hydrofluoric acid until visible reaction terminates;
    washing the sample with water;
    contacting the sample with from about 10 ml. to about 50 ml. of 70 weight percent hydrofluoric acid to solubilize certain silicate compounds; and then
    washing the sample with water and volatile organic solvent.

9. A method for predicting the character of hydrocarbons which may be found at a subterranean situs comprising:
    taking a series of rock samples from vertically spaced locations between the surface and the situs;
    acid treating each sample to concentrate kerogenous material occurring naturally therein and remove a substantial portion of any contained carbonates and silicates therefrom;
    observing a plurality of the thermal history-related paramagnetic resonance properties of each sample;
    using said properties to determine the maximum thermal history of the location from which the respective sample was taken;
    deriving a geothermal vertical gradient from said series of maximum thermal histories;
    extrapolating the geothermal vertical gradient to the depth of said situs to determine the maximum thermal history of the situs; and
    predicting the character of hydrocarbons at said situs on the basis of the maximum thermal history at the situs.

10. The method defined in claim 9 wherein said acid treating comprises:
    pulverizing the respective sample;
    treating the respective sample with hydrochloric acid;
    washing the sample substantially free of hydrochloric acid;
    treating the respective sample with hydrofluoric acid; and then
    washing the sample free of hydrofluoric acid.

11. The method defined in claim 9 wherein the paramagnetic resonance properties observed are (a) the spectral line position of the sample in the magnetic field, (b) the spectral line width, and (c) the spin concentration of the sample in spins per gram of organic carbon.

12. The method defined in claim 10 wherein the size of each of said samples when subjected to acid treatment is such that each sample will contain at least 1 weight percent kerogen upon completion of said acid treatment.

13. A method of determining the highest temperature to which a thermally uncharacterized subterranean rock has been heated at any time during its geologic history when petroleum forming organic matter may have been in the vicinity of the rock comprising:

measuring the paramagnetic resonance properties of the kerogen in subterranean rocks presently at such highest temperatures;

correlating said measured paramagnetic resonance properties to such highest temperature values;

repeating said measurement and correlation with a sufficient number of additional subterranean rocks to establish the repeatability and universality of said correlation; and then measuring the paramagnetic properties of said thermally uncharacterized rock to determine therefrom through said correlation, said highest temperature to which said uncharacterized rock has been heated.

* * * * *